H. LOMB & F. SCHARPF.
Apparatus for the Focal Measurement of Optical Lenses.

No. 196,028. Patented Oct. 9, 1877.

WITNESSES:
J. J. Bausch
John Klingler

Henry Lomb
Friederich Scharpf
INVENTORS.

UNITED STATES PATENT OFFICE.

HENRY LOMB, OF BROOKLYN, AND FRIEDERICH SCHARPF, OF ROCHESTER, NEW YORK; SAID SCHARPF ASSIGNOR TO SAID LOMB.

IMPROVEMENT IN APPARATUS FOR THE FOCAL MEASUREMENT OF OPTICAL LENSES.

Specification forming part of Letters Patent No. 196,028, dated October 9, 1877; application filed May 29, 1877.

*To all whom it may concern:*

Be it known that we, HENRY LOMB, of the city of Brooklyn, county of King's, and State of New York, and FRIEDERICH SCHARPF, of the city of Rochester, county of Monroe, and State of New York, have jointly made a new and useful Improvement in the Construction of Apparatus for the Focal Measurement of Optical Lenses; and we hereby declare that the following is a full and exact description thereof, reference being had to the accompanying drawings, and the letters marked on the same, of which—

Figure 1:
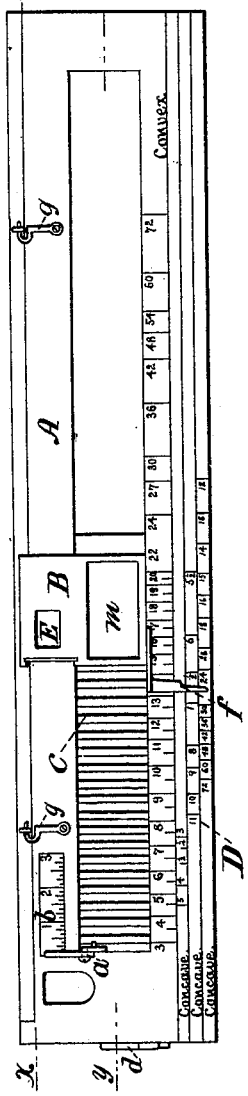
Figure 2:
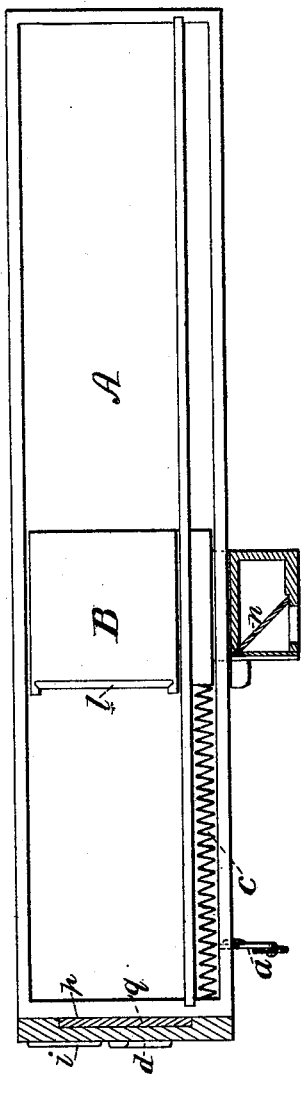
Figure 3:
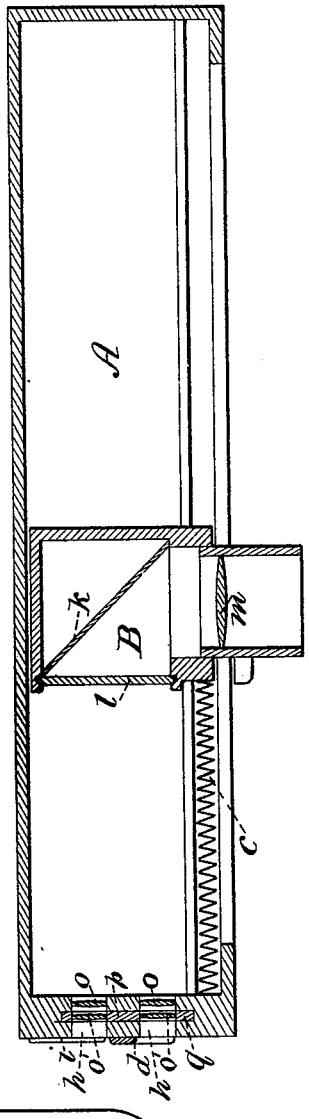
Figure 4:
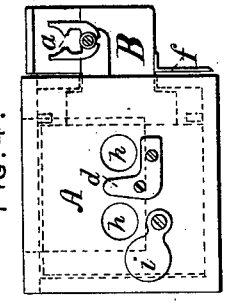
Figure 5:
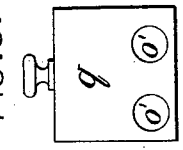
Figure 6:
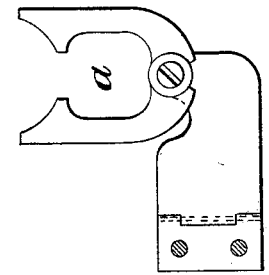

Figure 1 represents a side elevation; Fig. 2, a sectional plan at the line $x\ x$ of Fig. 1; Fig. 3, a sectional plan at the line $y\ y$ of Fig. 1; Fig. 4, a front view of our apparatus; Fig. 5, frame with convex lenses to assist in the measurement of concave glasses; Fig. 6, enlarged view of holder for small lenses.

This invention relates to instruments used for the measurement of the focal length of optical glasses; and its object is to provide an instrument capable of being used under varying circumstances and conditions.

The apparatus constructed by us for this purpose consists, as the drawing shows, of a box, A, with apertures $h\ h$ at one end to admit the light, in front of which apertures the lenses to be measured are placed, and held by a suitable contrivance or contrivances. Inside of this larger box A a smaller box, B, is placed, in such manner as to be capable of being moved or slid along the length of the large box A from the front to the rear, and vice versa. To the front of this smaller or sliding box B a semi-transparent plate, $l$, is attached vertically, and in the rear of this plate a vertical mirror, K, is placed at an angle of forty-five degrees to said plate. An apron or folding screen, C, is attached, with one end to the front of the large outside box A, and with the other end to the front of the small or sliding box B, thus converting the intervening space between the front part of the exterior box A and the front of the interior or sliding box B into a dark chamber or camera obscura by excluding the light therefrom, except that which enters through the apertures $h\ h$. Rays of light, entering through these apertures $h\ h$ through optical lenses placed in front of these apertures, will form, at the proper focal distance from these lenses, an image of any object placed in front of such lenses on the semi-transparent plate $l$ in front of the interior or sliding box B, which image is reflected by the mirror K. A magnifying-lens, $m$, is placed in the outer side of the sliding box B opposite the mirror, and at an angle of forty-five degrees with such mirror, for the purpose of assisting the sight of the operator, and to enable him to obtain greater accuracy of measurement.

In order to measure the focal length of one or two optical lenses, the same should be placed in front of the apertures $h\ h$ at the front end of the exterior box A; then the interior (small) box B should be moved backward slowly until a distinct image of any object chosen for the purpose, and placed at a convenient distance in front of the lenses, becomes visible in the mirror K, which will be the case when the semi-transparent plate $l$ has reached the proper focal distance of these lenses. A pointer, $f$, fastened to the lower front part of the sliding box B, in line with the semi-transparent plate $l$, will indicate the focal length of the measured lenses, in inches or other measurement, on the scale D, attached to the exterior box A. If only one lens is to be measured, one of the apertures $h\ h$ in front of the box A should be closed in a suitable manner. In our drawing this is represented as being done by the slide $i$ moving on a pivot.

The lug $d$ represents an arrangement for the support of eyeglass, spectacle, or lens frames, so as to permit the measurement of two lenses in a finished spectacle or eyeglass, thus, while showing the focal distance of the lenses, showing at the same time whether the foci of both lenses properly correspond.

For the measurement of convex lenses of small diameter, a small camera, E, is attached to the outside of the interior or sliding box B, and a swinging clamp, $a$, for holding such lenses, is fastened to the box A. A scale, $b$, is also attached to the side of the box A, for the purpose of measuring such lenses.

Convex lenses $o\ o$ are permanently fixed immediately in the rear of the apertures $h\ h$, for the purpose of shortening the focal length of the glasses to be measured, and thus enabling the operator to measure greater focal lengths than the length of the box A would otherwise permit.

By this means glasses of focal lengths from one inch to seventy-two inches or more may be measured in a measuring-box of our construction not exceeding three feet in length.

Small lenses from one-eighth inch upward in diameter, and of short focal length, can be measured by means of the clamp $a$, the small camera E, and the scale $b$, as above described.

For the purpose of measuring concave lenses, additional convex lenses $o'$ $o'$ are provided, in order to neutralize the concavity of such lenses, and to insure the production of a positive image on the semi-transparent plate $l$, and its corresponding reflection in the mirror K, when concave lenses are being measured. Different sets of such lenses $o'$ $o'$, of different degrees of convexity, are provided to meet the different degrees of concavity of different lenses. A space, $p$, is provided in the front part of the box A, immediately in front of the convex lenses $o$ $o$, and in rear of the apertures $h$ $h$, for the admission of the frame $q$, holding these additional convex lenses when their use becomes necessary to measure concave glasses. This frame completely fills the space $p$, thus preventing the entrance of any light through said space. When convex lenses are to be measured, this frame $q$, with the additional convex lenses $o'$ $o'$, is easily removed. The divisions on the measuring-scale D for the measurement of concave lenses are properly arranged or graduated with a view to the use of such additional convex lenses.

The top of the box A is closed by a hinged lid, fastened in a suitable manner.

In order to obtain a fixed and proper standard of measurement, and one which is capable of universal adoption, we base the graduations on the measuring-scales attached to this measuring-box on the focal measurement of lenses by direct sunlight, for the following reasons: The best and easiest mode of forming a universal standard for the measurement of optical lenses would probably be the direct application and exclusive use of strong sunlight for this purpose, if it were not for the fact that the varying positions of the sun during the different hours of the day make such application, even under otherwise most favorable circumstances, at certain times, difficult and inconvenient, while under a cloudy sky, and under unfavorable positions of the measuring-room, such kind of measurement would be utterly impossible. Means, therefore, have to be provided to measure optical glasses at such times and places when and where the direct use of strong sunlight is not practicable.

The generally-adopted plan for the measurement of optical lenses has been to ascertain the focal distance of a lens by finding the distance at which the image of an object arbitrarily chosen is formed by such a lens on an opposite white or light-colored screen or wall, the distance of the lens from such screen or wall under such circumstances being regarded as the focal distance of such lens.

Such measurement, however, greatly varies according to the distance at which the object so imaged is situated from the lens forming the image of it. This is owing to the different angle at which the rays of light enter such lens when the source from which they emanate is placed at a greater or lesser distance from the lens which is to be measured, forming corresponding angles of more or less acuteness at the surface of exit, and in consequence thereof a longer or shorter cone of refraction in the rear of the lens, or, in other words, showing a longer or shorter focal distance. Thus, for instance, it has been demonstrated by mathematical analysis, and corroborated by actual experiment, that a lens showing a focal distance of thirty inches, when measured by direct sunlight, (distance of source of light considered infinite,) will, with the rays reflected from an object chosen for measuring, and placed at a distance of fifty feet from such lens, form an image of such object on an opposite wall or screen at a distance therefrom of 31.58 inches, and with an object placed at a distance of twenty-five feet, at a distance of the lens from wall or screen of 33.33 inches.

Thus, the method above described, and usually followed by opticians and manufacturers of optical lenses, of measuring the focal distance of lenses by means of an object arbitrarily chosen as to its distance from the lens to be measured, causes great variations in the standard of focal measurement of opticians and manufacturers, the standard of nearly every one of them being more or less different in consequence thereof. Such arbitrary choice is, however, generally necessitated by the varying circumstances as to locality in which various opticians and manufacturers of optical lenses are placed, it being for this reason almost impossible to have all of them agree to the same uniform distance of the measuring object from the lens to be measured, and still more difficult for each of them to obtain such an object, fixed at such a uniform distance, for the purpose in question, even if such distance had been universally agreed upon.

Therefore, to obviate all the above-mentioned difficulties, we construct our scales in the following manner: We ascertain, by the direct action of strong sunlight, the focal measurement of a set of lenses, from the shortest to the longest focal distance which is to be measured by our measuring-box. We then ascertain with these lenses, whose focal measurement has been so obtained, the point at which each of these lenses forms the image of the measuring object on the diaphragm of our measuring-box successively for varying distances of the object from the lenses—for instance, for distances of one hundred, ninety, eighty, seventy, sixty, fifty feet, &c.—having a separate scale for each distance, and marking on each scale, at the point where each lens forms such image, the focal length of such lens as ascertained by sunlight, thus making a complete scale for each distance of the object, the graduations of such scale being based upon actual measurement of lenses by direct sunlight. The measurements, therefore, of all the scales bear a proper proportion to the distance from the lens to be measured of the object giving the image by which such measurement is made, and therefore exactly correspond to the measurement made by actual sunlight. These scales can also be graduated by mathematical calculations.

By this means those who are confined to short distances, as in measuring the focal distance of lenses in a house, or where the view is bounded by the side of a street, are enabled to obtain as accurate results as those who use the image of objects whose distance may practically be regarded as infinite.

The advantage of a measuring-box of our construction consists in the exclusion therefrom, when in operation, of all light except that which enters by means of the lenses placed in front of the same for the purpose of being measured.

The apparatus can therefore be used in a room full of light, and the observer or operator can see a clear and distinct image of the chosen object by looking at the mirror $k$ through the magnifying-lens $m$, whenever the semi-transparent plate $l$ has arrived at the distance corresponding to the correct focal measurement of the lens or lenses in question, while by means of the differently-graduated scales any convenient object, no matter at what distance it may be situated, may be used to be reflected in the camera for the purpose of focal measurement.

What we claim as new, and desire to secure by Letters Patent, is—

1. The combination of the stationary box A, having proper facilities for supporting the lenses to be measured, with the sliding box B, carrying the diaphragm and mirror, &c., the whole being arranged and operating in the manner and for the purposes substantially as above described.

2. The combination of the magnifying-lens $m$ with the sliding box B and its accessories, in the manner and for the purpose substantially as described.

HENRY LOMB.
FRIEDERICH SCHARPF.

Witnesses:
J. J. BAUSCH,
JOHN B. KLINGLER.